(12) United States Patent
Lee et al.

(10) Patent No.: US 6,834,340 B2
(45) Date of Patent: Dec. 21, 2004

(54) MECHANISM TO SAFELY PERFORM SYSTEM FIRMWARE UPDATE IN LOGICALLY PARTITIONED (LPAR) MACHINES

(75) Inventors: Van Hoa Lee, Cedar Park, TX (US); Sayileela Nulu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 09/798,164

(22) Filed: Mar. 1, 2001

(65) Prior Publication Data

US 2002/0124166 A1 Sep. 5, 2002

(51) Int. Cl.[7] ................................................ G06F 1/24
(52) U.S. Cl. ............................. 713/100; 713/2; 712/15
(58) Field of Search ............................... 713/1, 2, 100; 709/220, 221; 712/15; 714/10, 11, 12, 13

(56) References Cited

U.S. PATENT DOCUMENTS 5,684,974 A  * 11/1997 Onodera ..................... 711/202
6,173,375 B1 *  1/2001 Arshad ....................... 711/152
6,247,109 B1 *  6/2001 Kleinsorge et al. ........... 712/13
6,542,926 B2 *  4/2003 Zalewski et al. ............ 709/213

* cited by examiner

Primary Examiner—Rehana Perveen
Assistant Examiner—Thuan Du
(74) Attorney, Agent, or Firm—Duke W. Yee; Mark E. McBurney; Lisa L.B. Yociss

(57) ABSTRACT

A method for managing system firmware in a data processing system having a plurality of logical partitions is provided. Responsive to a request to update the system firmware from a first logical partition within the plurality of logical partitions in the data processing system, a determination is made whether the first logical partition within the plurality of logical partitions is present in the data processing system. Responsive to the determination that the first logical partition within the plurality of logical partitions is present in the data processing system, the system firmware is updated from the first logical partition in the data processing system. Then starting of additional partitions within the plurality of logical partitions in the data processing system is inhibited until the firmware update from the first logical partition is complete.

22 Claims, 4 Drawing Sheets

MECHANISM TO SAFELY PERFORM SYSTEM FIRMWARE UPDATE IN LOGICALLY PARTITIONED (LPAR) MACHINES

BACKGROUND OF THE INVENTION

1. Technical Field

The present invention relates generally to an improved data processing system and in particular to a method and apparatus in a symmetrical multiprocessing system. Still more particularly, the present invention provides a method and apparatus for updating the system firmware in a symmetrical multiprocessing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping subset of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition can not affect the correct operation of any of the other partitions. This is provided by allocating a disjoint set of platform resources to be directly managed by each OS image and by providing mechanisms for ensuring that the various images can not control any resources that have not been allocated to it. Furthermore, software errors in the control of an operating system's allocated resources are prevented from affecting the resources of any other image. Thus, each image of the OS (or each different OS) directly controls a distinct set of allocable resources within the platform.

One method that has been developed to create and maintain separation between the partitions within the data processing system is the use of a firmware component referred to as a hypervisor in the RS/6000 data processing system. The RS/6000 is a product and trademark of International Business Machines Corporation of Armonk, N.Y. This firmware component performs many functions and services for the various operating system images running within the logically partitioned data processing system.

In the earliest initial power load (IPL) stage, system firmware must perform hardware discovery of the input/output (I/O) subsystem, then initialize and assign system address ranges according to the system memory map for the presenting hardware. Data structures are established and updated when the discovery and initialization are complete.

Later, in the open firmware stage of the IPL, the open firmware must create its open firmware device tree based on the current hardware in the system. Thus, the open firmware must repeat the discovery of hardware components and store a data structure to describe the hardware.

Finally, in the last stage of the IPL, the runtime abstraction service (RTAS) firmware needs to know the hardware information so that it can provide services to the operating system during runtime. RTAS also analyzes and isolates hardware problems when the system encounters some error exceptions during runtime. RTAS must also perform the discovery process and create a data structure to describe the hardware.

With the need for more and more processing power, symmetrical multiprocessing (SMP) systems are being used more often. SMP is a computer architecture in which multiple processors share the same memory, containing one copy of the operating system, one copy of any applications that are in use, and one copy of the data. SMP reduces transaction time because the operating system divides the workload into tasks and assigns those tasks to whatever processors are free.

SMP systems often times experience failures. Sometimes these failures are so-called hard or solid errors, from which no recovery is possible. A hard error in a SMP system, in general, causes a system failure. Thereafter, the device that has caused the hard error is replaced. On the other hand, a number of failures are recoverable or so-called soft errors, which occur intermittently and randomly. In contrast to a hard error, a soft error, with proper recovery and retry design, can be recovered and prevent a SMP system from failing. Often these soft errors are localized to a particular processor within a SMP system.

When a RS/6000 machine is configured to run in the LPAR mode, an update of the System Firmware has to be performed without causing data loss to any running partition of the machine. One method to avoid data loss to any running partition is to reboot the system in a non-LPAR or SMP mode and then perform the update process. However, this may not be desirable since running partitions have to be shut down for the reboot to occur. Therefore, it would be advantageous to have a method and apparatus for updating system firmware when multiple partitions are run in LPAR mode wherein the partition with service authority updates the firmware.

SUMMARY OF THE INVENTION

The present invention provides a method for managing system firmware in a data processing system having a plurality of logical partitions. Responsive to a request to update the system firmware from a first logical partition within the plurality of logical partitions in the data processing system, a determination is made whether the first logical partition within the plurality of logical partitions is present in the data processing system and has service authority. Responsive to the determination that the first logical partition within the plurality of logical partitions is present in the data processing system and has service authority, the system firmware is updated from the first logical partition in the data processing system. Then starting of additional partitions within the plurality of logical partitions in the data processing system is inhibited until the firmware update from the first logical partition is complete.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
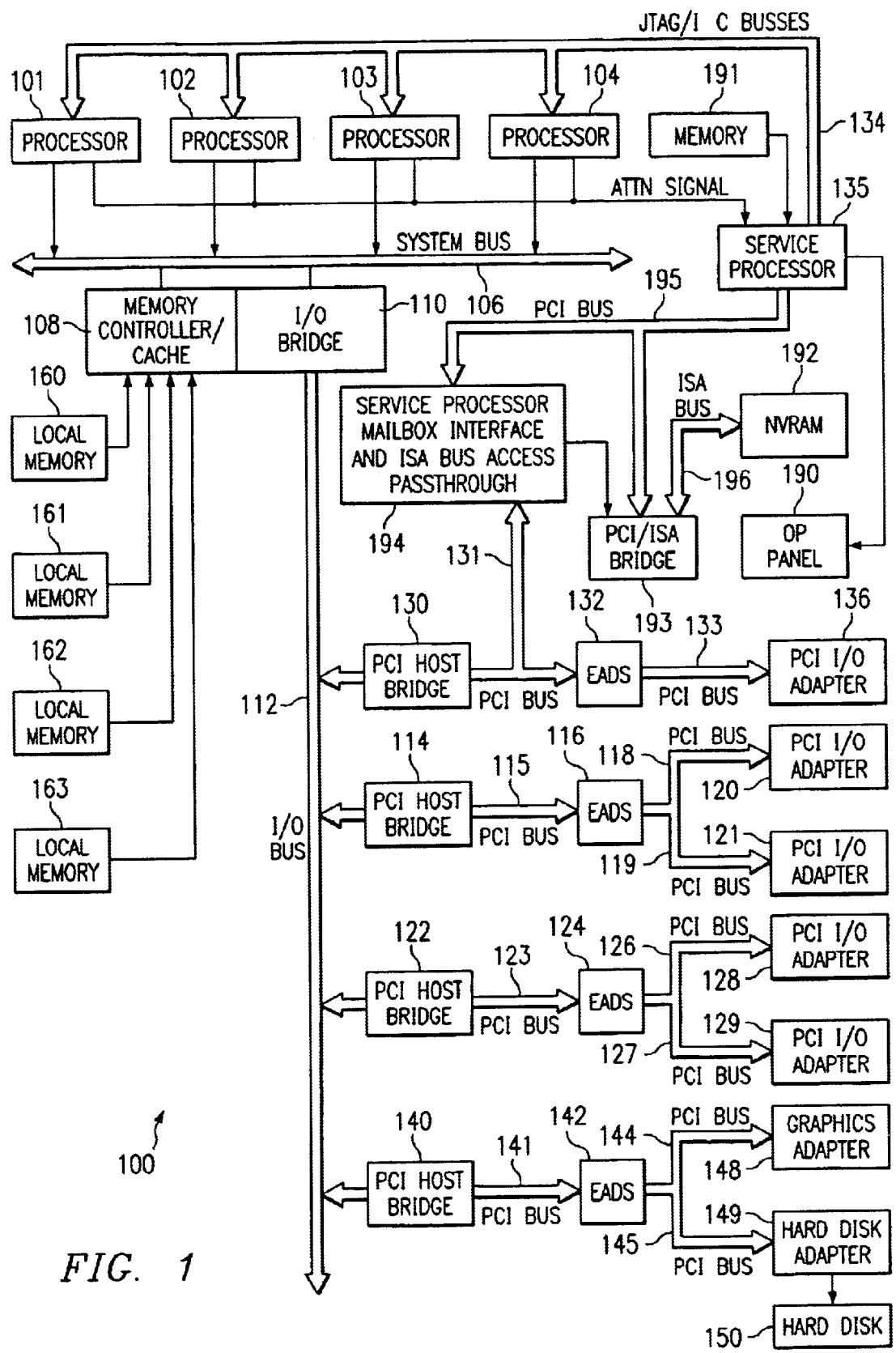
FIG. 1 depicts a block diagram of a data processing system in which the present invention may be implemented.

With reference now to the figures, and in particular with reference to FIG. 1, a block diagram of a data processing system in which the present invention may be implemented is depicted. Data processing system 100 may be a symmetric multiprocessor (SMP) system including a plurality of processors 101, 102, 103, and 104 connected to system bus 106. For example, data processing system 100 may be an IBM RS/6000, a product of International Business Machines Corporation in Armonk, N.Y., implemented as a server within a network. Alternatively, a single processor system may be employed. Also connected to system bus 106 is memory controller/cache 108, which provides an interface to a plurality of local memories 160–163. I/O bus bridge 110 is connected to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within in it. Data processing system 100 is logically partitioned such that different I/O adapters 120–121, 128–129, 136, and 148–149 may be assigned to different logical partitions.

Thus, for example, suppose data processing system 100 is divided into three logical partitions, P1, P2, and P3. Each of I/O adapters 120–121, 128–129, 136, and 148–149, each of processors 101–104, and each of local memories 160–164 is assigned to one of the three partitions. For example, processor 101, memory 160, and I/O adapters 120, 128, and 129 may be assigned to logical partition P1; processors 102–103, memory 161, and I/O adapters 121 and 136 may be assigned to partition P2; and processor 104, memories 162–163, and I/O adapters 148–149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIX) operating system may be executing within partition P1, a second instance (image) of the AIX operating system may be executing within partition P2, and a Windows 2000 operating system may be operating within logical partition P1. Windows 2000 is a product and trademark of Microsoft Corporation of Redmond, Wash.

Peripheral component interconnect (PCI) Host bridge 114 connected to I/O bus 112 provides an interface to PCI local bus 115. A number of Input/Output (I/O) adapters 120–121 may be connected to PCI bus 115. Typical PCI bus implementations will support between four and eight I/O adapters (i.e. expansion slots for add-in connectors). Each I/O Adapter 120–121 provides an interface between data processing system 100 and input/output devices such as, for example, other network computers, which are clients to data processing system 100.

An additional PCI host bridge 122 provide an interface for an additional PCI bus 123. PCI bus 123 is connected to a plurality of PCI I/O adapters 128–129 by a PCI bus 126–127. Thus, additional I/O devices, such as, for example, modems or network adapters may be supported through each of PCI I/O adapters 128–129. In this manner, data processing system 100 allows connections to multiple network computers.

A memory mapped graphics adapter 148 may be connected to I/O bus 112 through PCI Host Bridge 140 and EADS 142 (PCI—PCI bridge) via PCI buses 141 and 144 as depicted. Also, a hard disk 150 may also be connected to I/O bus 112 through PCI Host Bridge 140 and EADS 142 via PCI buses 141 and 145 as depicted. EADS is the IBM internal name of a chip which provides 8 PCI—PCI bridges that support hot plugging of PCI adapters on the secondary buses.

A PCI host bridge 130 provides an interface for a PCI bus 131 to connect to I/O bus 112. PCI bus 131 connects PCI host bridge 130 to the service processor mailbox interface and ISA bus access pass-through logic 194 and EADS 132. The ISA bus access pass-through logic 194 forwards PCI accesses destined to the PCI/ISA bridge 193. The NV-RAM storage is connected to the ISA bus 196. The Service processor 135 is coupled to the service processor mailbox interface 194 through its local PCI bus 195. Service processor 135 is also connected to processors 101–104 via a plurality of JTAG/I$^2$C buses 134. JTAG/I$^2$C buses 134 are a combination of JTAG/scan busses (see IEEE 1149.1) and Phillips I$^2$C busses. However, alternatively, JTAG/I$^2$C buses 134 may be replaced by only Phillips I$^2$C busses or only JTAG/scan busses. All SP-ATTN signals of the host processors 101, 102, 103, and 104 are connected together to an interrupt input signal of the service processor. The service processor 135 has its own local memory 191, and has access to the hardware op-panel 190. JTAG stands for Joint Test Action Group. This group created the foundation for IEEE 1149.1 standard describing the Test Access Port and Boundary Scan Architecture. I$^2$C stands for Inter-IC which is a bus interface specification invented by Philips.

When data processing system 100 is initially powered up, service processor 135 uses the JTAG/scan buses 134 to interrogate the system (Host) processors 101–104, memory controller 108, and I/O bridge 110. At completion of this step, service processor 135 has an inventory and topology understanding of data processing system 100. Service processor 135 also executes Built-In-Self-Tests (BISTs), Basic Assurance Tests (BATs), and memory tests on all elements found by interrogating the system processors 101–104, memory controller 108, and I/O bridge 110. Any error information for failures detected during the BISTs, BATs, and memory tests are gathered and reported by service processor 135.

If a meaningful/valid configuration of system resources is still possible after taking out the elements found to be faulty during the BISTs, BATs, and memory tests, then data processing system 100 is allowed to proceed to load executable code into local (Host) memories 160–163. Service processor 135 then releases the Host processors 101–104 for execution of the code loaded into Host memory 160–163. While the Host processors 101–104 are executing code from respective operating systems within the data processing system 100, service processor 135 enters a mode of monitoring and reporting errors. The type of items monitored by service processor include, for example, the cooling fan speed and operation, thermal sensors, power supply regulators, and recoverable and non-recoverable errors reported by processors 101–104, memories 160–163, and bus-bridge controller 110.

Service processor 135 is responsible for saving and reporting error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Power Loads (IPLs). IPLs are also sometimes referred to as a "boot" or "bootstrap".

Those of ordinary skill in the art will appreciate that the hardware depicted in FIG. 1 may vary. For example, other peripheral devices, such as optical disk drives and the like, also may be used in addition to or in place of the hardware depicted. The depicted example is not meant to imply architectural limitations with respect to the present invention.

Figure 2:
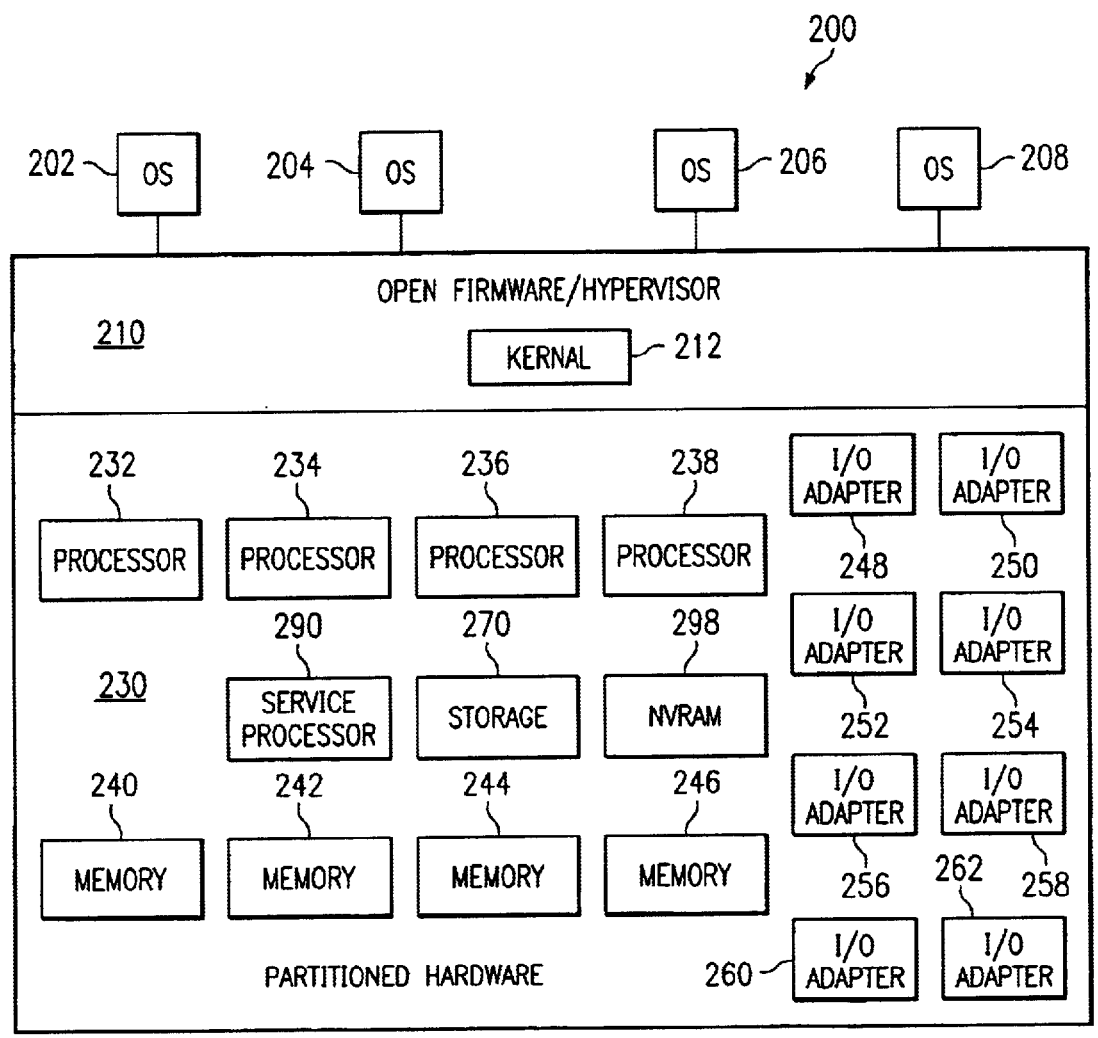
FIG. 2 depicts a block diagram of an exemplary logically partitioned platform in which the present invention may be implemented.

FIG. 2 is a block diagram of an exemplary logically partitioned platform is depicted in which the present invention may be implemented. The hardware in logically partitioned platform 200 may be implemented as, for example, server 100 in FIG. 1. Logically partitioned platform 200 includes partitioned hardware 230, Open Firmware/Hypervisor 210, and operating systems 202–208. Operating systems 202–208 may be multiple copies of a single operating system or multiple heterogeneous operating systems simultaneously run on platform 200.

Partitioned hardware 230 includes a plurality of processors 232–238, a plurality of system memory units 240–246, a plurality of input/output (I/O) adapters 248–262, and a storage unit 270. Each of the processors 242–248, memory units 240–246, NV-RAM storage 298, and I/O adapters 248–262 may be assigned to one of multiple partitions within logically partitioned platform 200, each of which corresponds to one of operating systems 202–208.

Open Firmware/Hypervisor 210 performs a number of functions and services for operating system images 202–208 to create and enforce the partitioning of logically partitioned platform 200. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM).

Open Firmware/Hypervisor 210 is a firmware implemented virtual machine identical to the underlying hardware. Thus, Open Firmware/Hypervisor 210 allows the simultaneous execution of independent OS images 202–208 by virtualizing all the hardware resources of logically partitioned platform 200. Open Firmware/Hypervisor 210 may attach I/O devices through I/O adapters 248–262 to single virtual machines in an exclusive mode for use by one of OS images 202–208.

At startup, in the earliest initial power load (IPL) stage, the system firmware must perform the hardware discovery of the I/O subsystem, then initialize and assign system address ranges according to the system memory map for the presenting hardware. Data structures are established and updated when the discovery and initialization are complete.

The present invention provides a mechanism to support flash_update-and-reboot RTAS call from an operating system to perform system firmware update in a LPAR capable machine. In LPAR mode, the mechanism is carried out in a hypervisor code. The hypervisor may enforce protection to make sure that the partition with service authority only performs this, specific function. Before the mechanism is to be executed, a partition manager may be informed not to start any new partitions so that the service authorized partition may complete the system firmware update and safely reboot the machine.

Figure 3:
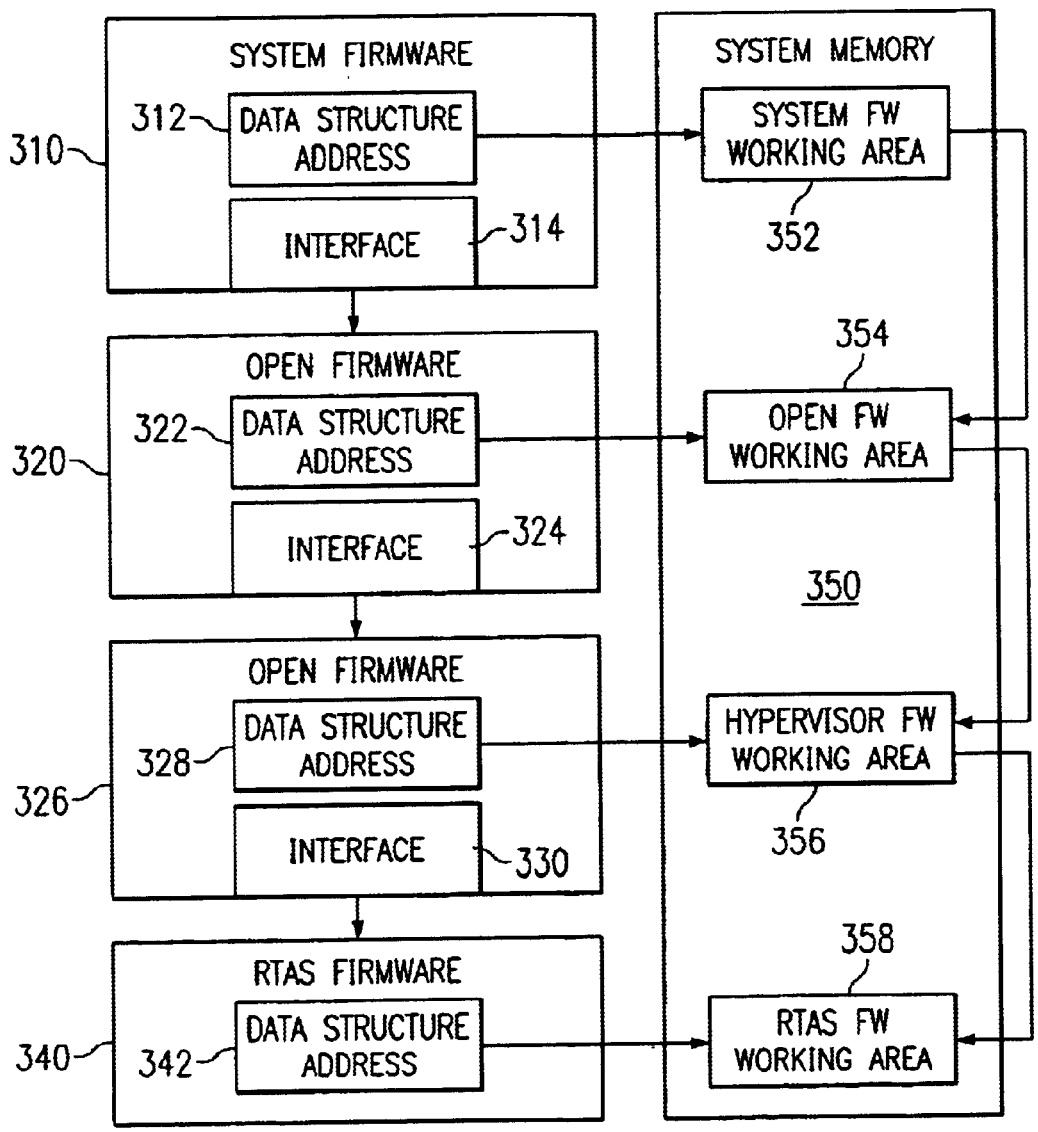
FIG. 3 is a block diagram of a firmware arrangement in accordance with a preferred embodiment of the present invention.

FIG. 3 is a block diagram of a firmware arrangement in accordance with a preferred embodiment of the present invention. System firmware (FW) 310 performs hardware discovery in the earliest IPL stage and creates data structures in system firmware working area 352 of system memory 350.

In the open firmware stage of the IPL, system firmware 310 provides data structure address 312 to open firmware 320 through interface (IF) 314. Open firmware 320 then creates a copy of the data structures from system firmware 310 into open firmware working area 354 of system memory 350.

In the hypervisor firmware stage of the IPL, open firmware 320 provides data structure address 322 to hypervisor firmware 326 through interface 324. Hypervisor firmware 326 then creates a copy of the data structures from open firmware 320 into hypervisor firmware working area 356 of system memory 350.

When a RTAS firmware component is instantiated, hypervisor firmware 326 provides data structure address 328 to RTAS firmware 340 through interface 330. RTAS firmware 340 then creates a copy of the data structures from hypervisor firmware 326 into RTAS firmware working area 358 of system memory 350.

Figure 4:
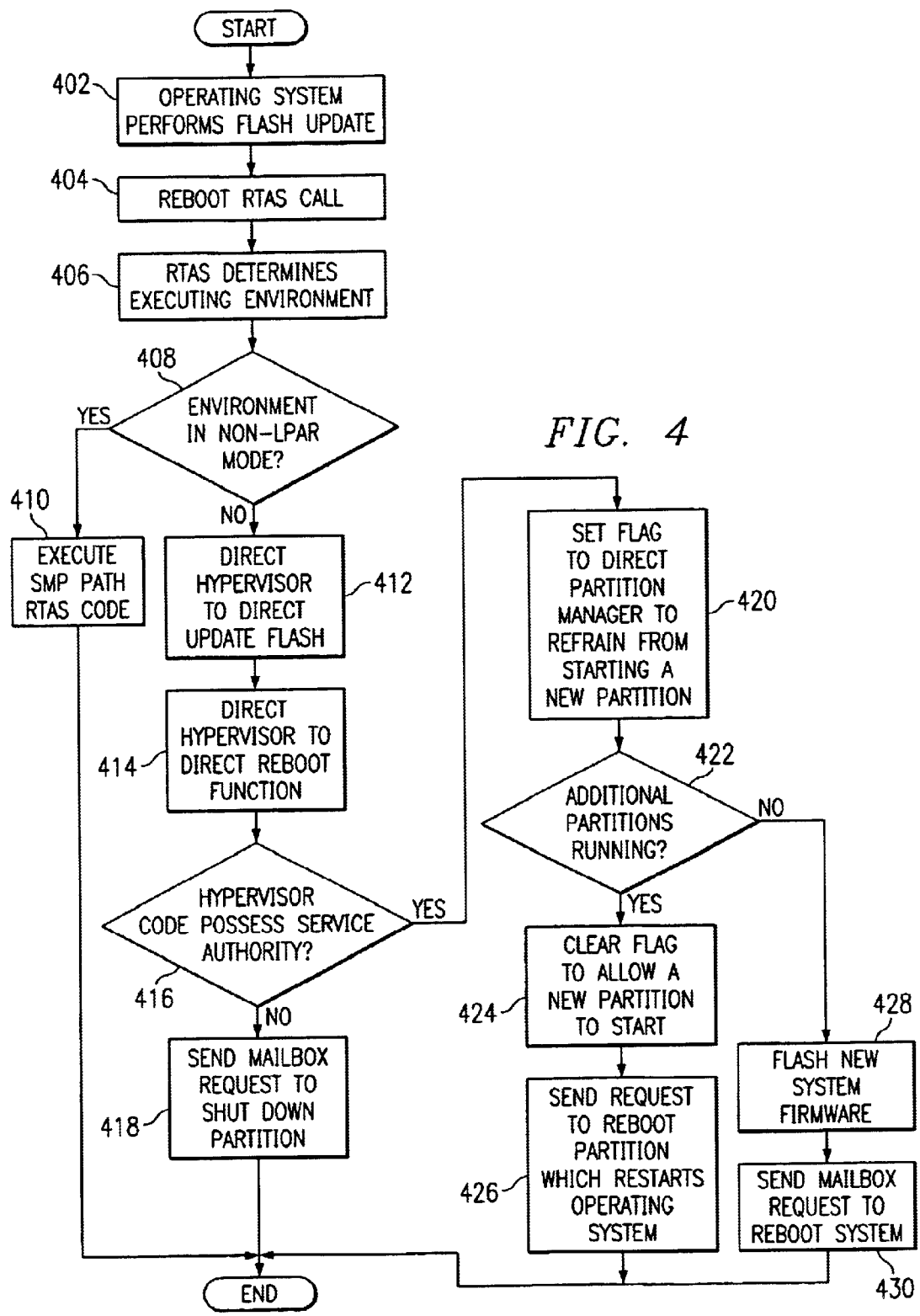
FIG. 4 illustrates a flowchart of the operation of a updating firmware in a logically partitioned machine in accordance with a preferred embodiment of the present invention.

FIG. 4 illustrates a flowchart of the operation of a updating firmware in a logically partitioned machine in accordance with a preferred embodiment of the present invention. In this example, the operation begins by an operating system performing a flash update (step 402). Then a reboot is made by a RTAS call (step 404). The RTAS then determines the executing environment (step 406). Then a determination is made as to whether or not the executing environment is in a non_LPAR mode (step 408). If the executing environment is in a non-LPAR mode (step 408:YES), then the system is executing the SMP path of the RTAS code to perform the system firmware update and then to reboot the system (step 410) and thereafter the operation terminates.

If the executing environment is not in a non_lpar mode (step 408:NO), the hypervisor is directed to direct the flash update (step 412). The hypervisor is then directed to direct the reboot function (step 414). Then a determination is made as to whether or not a hypervisor code possesses service authority (step 416).

If the hypervisor code does not possess service authority (step 416:NO), a mailbox is sent a request to shut down the partition (step 418) and thereafter the operation terminates. If the hypervisor code does possess service authority (step 416:YES), a flag is set to direct a partition manager to refrain from starting a new partition (step 420). Then a determination is made as to whether or not additional partitions are miming (step 422). If additional partitions are not running (step 422!NO), new system hardware is flashed (step 428). Then a mailbox request is sent to reboot the system (step 430) and thereafter the operation terminates. If additional partitions are running (step 422:YES), the flag is cleared to allow a new partition to start (step 424). Then a request is sent to reboot the partition when the operating system is enabled (step 426) and thereafter the operation terminates.

Thus, the present invention solves the disadvantages of the prior art by providing a method and apparatus for updating system firmware when multiple partitions are run in LPAR mode wherein the partition with service authority updates the firmware. The system may reboot in LPAR mode when a partition with service authority updates the firmware and no additional partitions may be started until the firmware update occurs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing system firmware in a data processing system having a plurality of logical partitions, said data processing system including partitioned hardware that includes a plurality of devices, each one of said plurality of devices being assigned to one of said plurality of logical partitions, each one of said plurality of logical partitions executing a different one of a plurality of operating systems, each one of said plurality of operating systems being able to access only ones of said plurality of devices that are assigned to one of said plurality of partitions that is executing said one of said plurality of operating systems, the method comprising the steps of:

during a reboot of said data processing system iii a logically partitioned mode;

responsive to a request to update the system firmware from a first logical partition within the plurality of logical partitions in the data processing system, determining whether the first logical partition within the plurality of logical partitions is present in the data processing system;

determining whether the first logical partition has authority to update the system firmware;

responsive to a determination that the first logical partition has authority to update the system firmware, determining that the first logical partition has service authority;

responsive to determining a first logical partition within the plurality of logical partitions is present in the data processing system and has service authority, updating the system firmware from the first logical partition in the data processing system; and inhibiting starting of additional partitions within the plurality of logical partitions in the data processing system until the system firmware update from the first logical partition is complete.

2. The method as recited in claim 1, further comprising:

responsive to completion of the system firmware update from the first logical partition, receiving a request to reboot the data processing system from the first logical partition; and activating a system reboot function to restart the data processing system using the updated system firmware.

3. The method as recited in claim 2, wherein rebooting the data processing system is performed by a hypervisor.

4. The method as recited in claim 1, wherein the request to update the system firmware from the first logical partition is received from a remote terminal.

5. The method as recited in claim 1, wherein the request to update the system firmware from the first logical partition is received from a hypenrisor.

6. The method as recited in claim 1, wherein updating the system firmware from the first logical partition in the data processing system is performed by a hypervisor.

7. The method as recited in claim 6, wherein the hypervisor ensures that only the first logical partition in the data processing system performs the system firmware update.

8. A logically partitioned data processing system having a plurality of logical paititions, said data processing system including partitioned hardware that includes a plurality of devices each one of said ulurality of devices being assigned to one of said plurality of logical partitions, each one of said plurality of logical partitions executing a different one of a plurality of operating systems, each one of said plurality of operating systems being able to access only ones of said plurality of devices that are assigned to one of said plurality of partitions that is executing said one of said plurality of operating systems, said data processing system comprising:

a bus system;

a communications unit connected to the bus system;

a memory connected to the bus system, the memory including a set of instructions; and a processing unit connected to the bus system, wherein the processing unit executes the set of instructions from the memory during a reboot of said logically partitioned system in a logically partitioned mode; to determine whether a first logical partition within the plurality of logical partitions is present in the data processing system, determine whether the first logical partition has authority to update the system firmware, responsive to a determination that the first logical partition has authority to update the system firmware, determining that the first logical partition has service authority, in response to receiving a request to update the system firmware from a first logical partition within the plurality of partitions, updates the system firmware from the first logical partition in the data processing system, in response to determining a first logical partition within the plurality of logical partitions is present in the data processing system and has service authority, and inhibits starting of additional partitions within the plurality of logical partitions in the data processing system until the system firmware update from the first partition is complete.

9. A data processing system for managing system firmware, said data processing system having a plurality of logical partitions, said data processing system includina partitioned hardware that includes a plurality of devices, each one of said plurality of devices being assigned to one of said plurality of logical partitions, each one of said plurality of logical partitions executing a ditferent one of a plurality of operating systems, each one of said plurality of operating systems being able to access only ones of said plurality of devices that are assigned to one of said plurality of partitions that is executing said one of said plurality of operating systems, said data processing system comprising:

determining means, responsive to a request to update the system firmware from a first logical partition within the plurality of logical partitions in the data processing system, for, during a reboot of said data processing system in a, logically partitioned mode, determining whether a first logical partition within the plurality of logical partitions is present in the data processing system;

determining means for, during a reboot of said data processing system in a logically partitioned mode, determining whether the first logical partition has authority to update the system;

responsive to a determination that the first logical partition has authority to update the system firmware, determining means for, during a reboot of said data processing system in a logically partitioned mode, determining that the first logical partition has service authority;

updating means, responsive to determining a first logical partition within the plurality of logical partitions is present in the data processing system and has service authority, for, during a reboot of said data processing system in a logically partitioned mode, updating the system firmware from the first logical partition in the data processing system; and inhibiting means for, during a reboot of said data processing system in a logically partitioned mode, inhibiting starting of additional partitions within the plurality of logical partitions in the data processing system until the system firmware update from the first logical partition is complete.

10. The data processing system as recited in claim 9, further comprising:

receiving means, responsive to completion of the system firmware update from the first logical partition, for receiving a request to reboot the data processing system from the first logical partition; and activating means for activating a system reboot function to restart the data processing system using the updated system firmware.

11. The data processing system as recited in claim 10, wherein rebooting the data processing system is performed by a hypervisor.

12. The data processing system as recited in claim 9, wherein the request to update the system firmware from the first logical partition is received from a remote terminal.

13. The data processing system as recited in claim 9, wherein the request to update the system firmware from the first logical partition is received from a hypervisor.

14. The data processing system as recited in claim 9, wherein updating the system firmware from the first logical partition in the data processing system is performed by a hypervisor.

15. The data processing system as recited in claim 14, wherein the hypervisor ensures that only the first logical partition in the data processing system performs the system firmware update.

16. A computer program product in a computer readable medium for managing system firmware in a data processing system having a plurality of logical partitions, said data processing system including partitioned hardware that includes a plurality of devices, each one of said plurality of devices being assigned to one of said plurality of logical partitions, each one of said plurality of logical partitions executing a different one of a plurality of operating systems, each one of said plurality of operating systems being able to access only ones of said plurality of devices that are assigned to one of said plurality of partitions that is executing said one of said plurality of operating systems, said product comprising:

instructions, responsive to a request to update the system firmware from a first logical partition within the plurality of logical partitions in the data processing system, for, during a reboot of said data processing system in a logically partitioned mode, determining whether a first logical partition within the plurality of logical partitions is present in the data processing system;

instructions for determining, during a reboot of said data processing system in a logically partitioned mode, whether the first logical partition has authority to update the system firmware;

responsive to a determination that the first logical partition has authority to update the system firmware, instructions for determining, during a reboot of said data processing system in a logically partitioned mode, that the first logical partition has service authority;

instructions, responsive to determining a first logical partition within the plurality of logical partitions is present in the data processing system and has service authority, for, during a reboot of said data processing system in a logically partitioned mode, updating the system firmware from the first logical partition in the data processing system; and instructions for, during a reboot of said data processing system in a logically partitioned mode, inhibiting starting of additional partitions within the plurality of logical partitions in the data processing system until the system firmware update from the first logical partition is complete.

17. The computer program product as recited in claim 16, further comprising:

instructions, responsive to completion of the system firmware update from the first logical partition, for receiving a request to reboot the data processing system from the first logical partition; and instructions for activating a reboot signal for a reboot function to restart the data processing system using the updated system firmware.

18. The computer program product as recited in claim 17, wherein rebooting the data processing system is performed by a hypervisor.

19. The computer program product as recited in claim 16, wherein the request to update the system firmware from the first logical partition is received from a remote terminal.

20. The computer program product as recited in claim 16, wherein the request to update the system firmware from the first logical partition is received from a hypervisor.

21. The computer program product as recited in claim 16, wherein updating the system firmware from the first logical partition in the data processing system is performed by a hypervisor.

22. The computer program product as recited in claim 21, wherein the hypervisor ensures that only the first logical partition in the data processing system performs the system firmware update.

* * * * *

UNITED STATES PATENT AND TRADEMARK OFFICE
CERTIFICATE OF CORRECTION

PATENT NO. : 6,834,340 B2  Page 1 of 1
DATED : December 21, 2004
INVENTOR(S) : Lee et al.

It is certified that error appears in the above-identified patent and that said Letters Patent is hereby corrected as shown below:

Column 5,
Line 64, before "RTAS" delete "flash_update-and-reboot" and insert
-- flash_update_and_reboot --.

Column 6,
Line 59, before "new" delete "(step 422!NO)," and insert -- (step 422:NO), --.
Line 59, after "system" delete "hardware".
Line 64, after "partition" delete "when" and insert -- which restarts --.
Lines 64-65, after "system" delete "is enabled".

Column 7,
Line 40, after "system" delete "iii" and insert -- in --.

Column 8,
Line 10, after "from a" delete "hyphenrisor" and insert -- hyper visor --.
Line 20, before "each" delete "devices" and insert -- devices, --.
Line 20, after "said" delete "lurality" and insert -- plurality --.
Line 35, after "mode" delete ";" and insert -- : --.
Line 56, after "system" delete "including" and insert -- including --.
Line 60, after "executing a" delete "ditferent" and insert -- different --.

Column 9,
Line 3, after "in a" delete ",".
Lines 12-13, after "firmware," delete "detenning" and insert -- determining --.
Line 52, after "processing" delete "systcm" and insert -- system --.

Signed and Sealed this

Twenty-fifth Day of April, 2006

JON W. DUDAS
*Director of the United States Patent and Trademark Office*